March 15, 1960
C. L. JOHNSON
2,928,627
AIRCRAFT PROPULSION SYSTEMS
Filed July 10, 1956
3 Sheets-Sheet 1
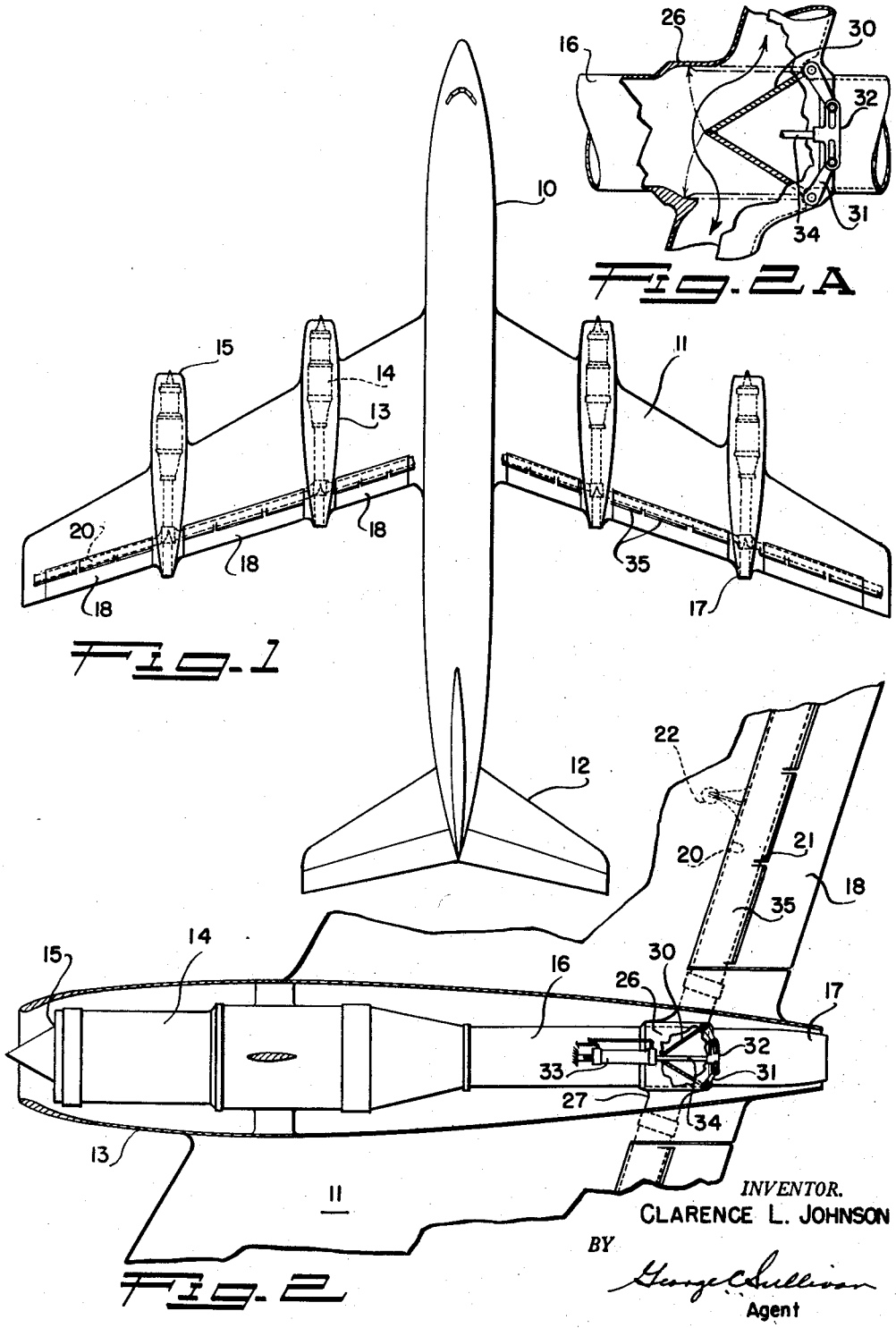
INVENTOR.
CLARENCE L. JOHNSON
BY
George C. Sullivan
Agent March 15, 1960  C. L. JOHNSON  2,928,627
AIRCRAFT PROPULSION SYSTEMS
Filed July 10, 1956  3 Sheets-Sheet 2
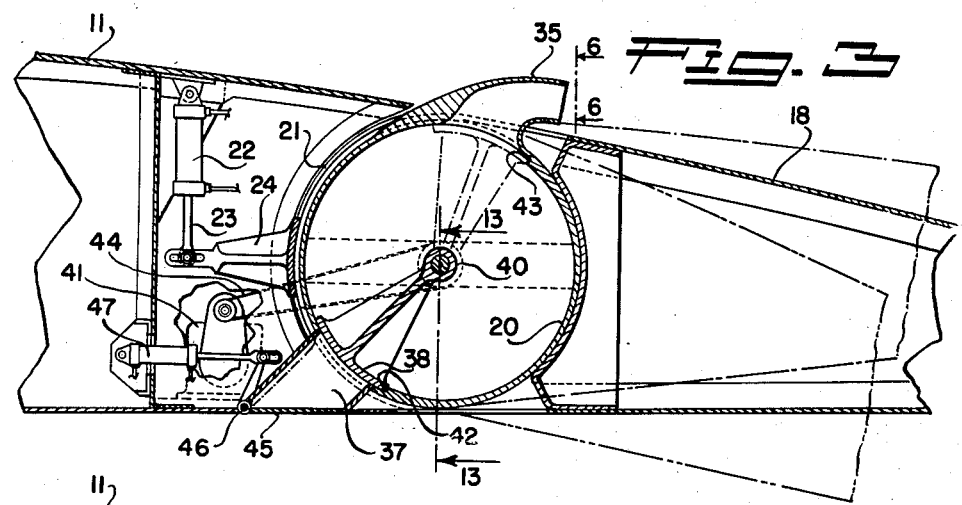
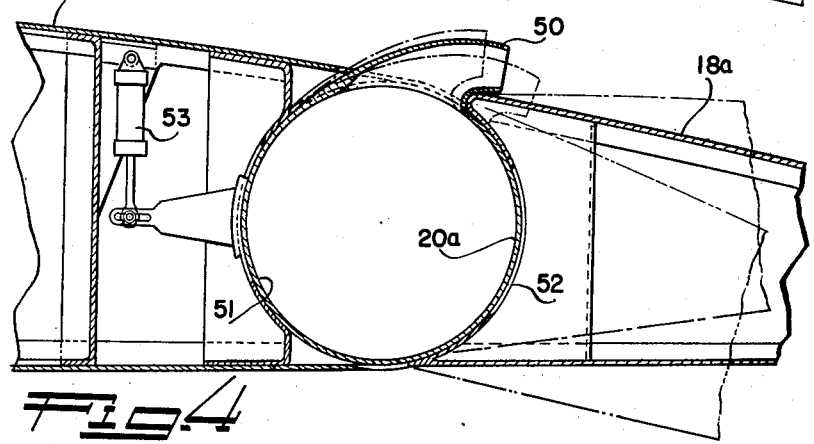
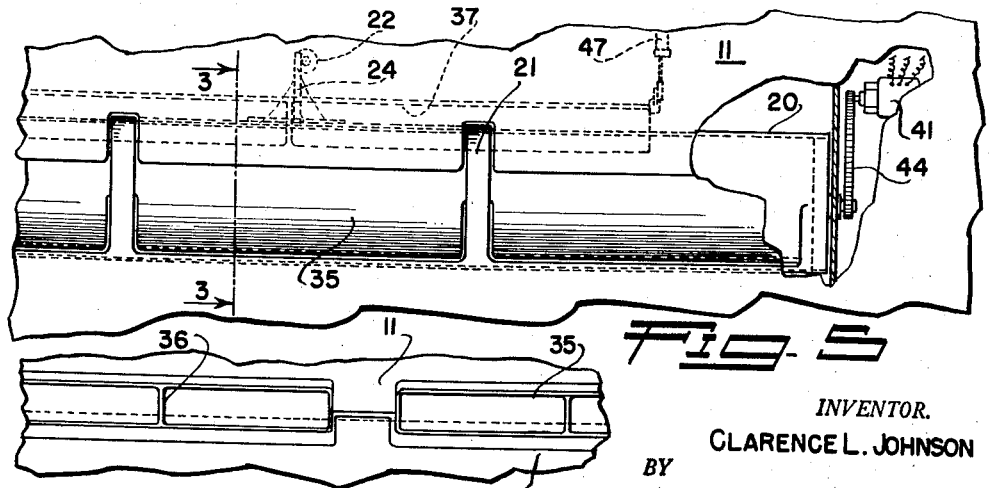
INVENTOR.
CLARENCE L. JOHNSON
BY
*George C. Sullivan*
Agent

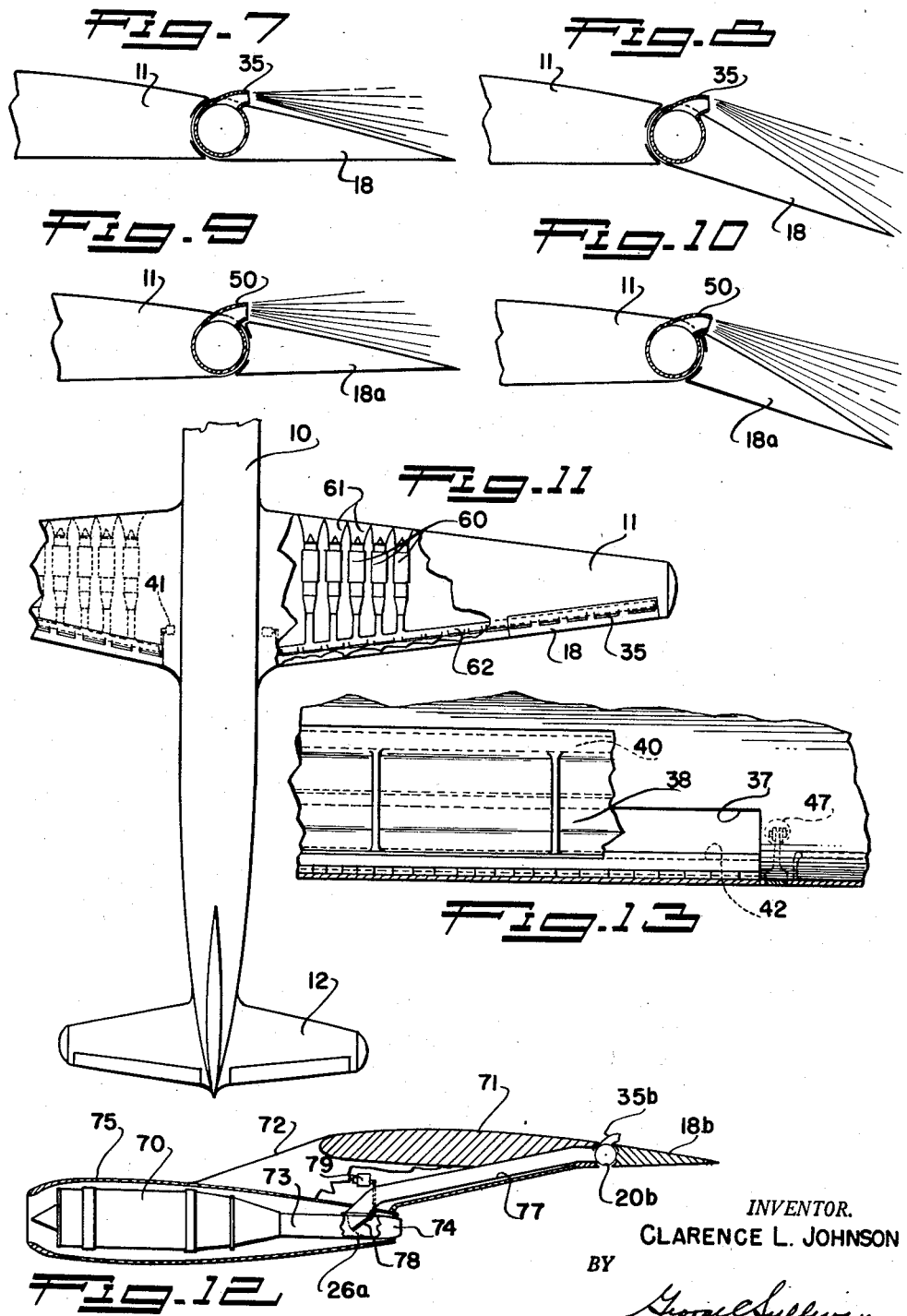

united States Patent Office 2,928,627
Patented Mar. 15, 1960

2,928,627

AIRCRAFT PROPULSION SYSTEMS

Clarence L. Johnson, Encino, Calif., assignor to Lockheed Aircraft Corporation, Burbank, Calif.

Application July 10, 1956, Serial No. 597,014

16 Claims. (Cl. 244—42)

This invention relates to the propulsion of aircraft and relates more particularly to reactive jet propulsion and control systems. It is a general object of the invention to provide an aircraft propulsive system utilizing the propulsive jet stream of one or more turbo-jet engines, or the equivalent, in manners to produce increased wing lift and reduced aerodynamic drag while providing for a thrust reversal and directional control, reduced jet noise and other additional advantages.

Another object of the invention is to provide a propulsive system of this character that effectively increases the wing lift. The system is operable to discharge the jet exhaust stream in the form of a relatively thin high velocity layer-like jet over the wing flaps to constitute a portion or all of the propulsive action for cruising and for lift augmentation and/or control during take-off and landing, utilizing what may be termed a "jet flap" action.

Another object of the invention is to provide a system of this kind incorporating means integral or associated with the flap-jet stream exhaust structure operable when desired or necessary to reverse the jet exhaust stream, that is direct the propulsive stream forwardly for deceleration and control purposes. This jet reversing action may be obtained with the associated wing flap in any selected angular position and the thrust reversing elements may be intimately associated with the wing flap and wing flap jet stream exhaust members to form a compact, lightweight, practical installation.

Another object of the invention is to provide a propulsive system of the kind just mentioned characterized by a simple effective valve within the valve tube operable to control both the jet flap exhaust orifice or slot and the jet reversing slot.

Another object of the invention is to provide an aircraft propulsive system in which the propulsive jet stream of one or more engines is directed in whole or in part to the wing flap jet discharge orifices or reversing orifices or to propulsive nozzles aft of the engines themselves as the conditions of flight may dictate. The invention provides a duct leading from the tail pipe or pipes of the engine or engines to the propulsive stream tube of the wing flaps and a diverting means or valve at the tail pipe controllable to cause the propulsive jet stream to discharge aft through the propulsive nozzle of the engine, to cause the stream to flow through the flap tube to the flap orifices and reversal orifices or to cause the stream to be divided for partial flow to both the propulsive nozzle and the flap tube. The valve or jet stream diverting means may also be employed to "cross transfer" the propulsive jet streams of the engines, that is direct or allow the propulsive stream from one engine or one group of engines to flow from the span-wise duct of that engine or group into the span-wise duct of another engine or group of engines to obtain more uniform propulsive stream discharge pressures and to assure the span-wise distribution of the propulsive jet stream in the event of shut-down or failure of an engine or group of engines.

It is another object of the invention to provide a propulsive system of the class described that may be incorporated in aircraft having their engines submerged in the wings, on the upper or lower sides of the wings, carried on pylons depending from the wings or otherwise associated with the airframe. The invention contemplates the integration of the propulsive system in aircraft and airframes of various types and configurations and utilizing any suitable reaction propulsive engines.

Other objectives and features will become apparent from the following detailed description of typical preferred embodiments and applications throughout which description reference will be had to the accompanying drawings in which:

Figure 1 is a plan view of an airplane incorporating the invention;

Figure 2 is an enlarged fragmentary plan view of a portion of the airplane showing an engine nacelle and a portion of the propulsive system in horizontal cross section;

Figure 2A is an enlarged sectional view of a valve or flow diverting means;

Figure 3 is an enlarged vertical detailed sectional view of a portion of a wing and its flap, illustrating the propulsive stream tube associated with the flap and the valve and flap actuating mechanisms;

Figure 4 is a view similar to Figure 3 showing a slightly modified wing and flap construction, both Figures 3 and 4 illustrating a plurality of positions of the flap in broken lines;

Figure 5 is a fragmentary enlarged plan view of the wing and flap assembly illustrating the means for mounting and actuating the flap;

Figure 6 is an enlarged fragmentary rear elevation taken as indicated by line 6—6 on Figure 3;

Figures 7 and 8 are diagrammatic views of the flap and propulsive and control system of Figure 3 showing the flap in different positions;

Figures 9 and 10 are views similar to Figures 7 and 8 illustrating different positions of the flap illustrated in Figure 4;

Figure 11 is a fragmentary plan view of another airplane incorporating the invention with portions broken away to illustrate the general arrangement of the powerplants in the wing;

Figure 12 is a fragmentary vertical sectional view of a wing and a powerplant supported therefrom by a pylon illustrating the invention associated therewith; and Figure 13 is a fragmentary sectional view taken as indicated by line 13—13 on Figure 3.

The principles and features of the invention may be applied to and incorporated in aircraft of various types and design and, of course, may be modified or adapted to suit them for given applications. I will proceed with descriptions of the particular applications illustrated in the accompanying drawings, it being understood that these descriptions are not intended to limit or restrict the invention to the specific details or applications set forth.

Figures 1, 2, 3 and 5 to 8 and 13 show the invention applied to or incorporated in a multi-engine airplane of generally conventional design having a fuselage 10, wings 11 and an empennage 12. The particular wings 11 illustrated are of swept back design and each carries two spaced power eggs or nacelles 13 for the powerplants or engines 14 although this configuration and arrangement is capable of wide variation. The engines 14 may be housed or submerged in the wings 11 or mounted above or below the wings without departing from the invention. Furthermore, the engines 14 may be of any selected or required type of machine for producing propulsive gas streams. In the present disclosure it will be assumed the engines 14 are of the turbo-jet type wherein each engine has a ram air inlet 15 at its forward end and an exhaust stack or tail pipe 16 at its aft end for conducting the high pressure propulsive stream of combustion gases and air rearwardly. Such turbo-jet engines are usually equipped with propulsive nozzles for discharging the gas streams in the form of propulsive jets. I have shown such propulsive nozzles 17 at the aft ends of the tail pipes 16 where they protrude beyond the trailing edges of the wings 11. The engine tail pipes 16 may have afterburners to add energy to the propulsive streams and the nozzles 17 will usually be of the variable area type. The details of the afterburners and variable area nozzles 17 are omitted from the present disclosure since they are well known to those skilled in the art. The nacelles 13 are shown in a schematic manner so as to surround the powerplants 14 with clearance, leaving annular cooling air passages but such an arrangement is optional.

The trailing edges of the wings 11 are provided with control surfaces in the nature of ailerons or flaps movable with respect to the wings to produce roll, to produce landing speed, to increase take-off speed, assist climb, etc. In accordance with the invention these surfaces may extend substantially the entire length of the trailing edge, may extend selected distances along portions of the wing edge and may be continuous or sectional, depending upon the particular airplane and the propulsive and control effects desired. In Figures 1, 2, 3 and 4 to 8 I have shown the control surfaces 18 on the trailing edge of each wing 11 arranged between and at each side of the engine nacelles 13, it being understood that this is one application or manner of employing the invention. The inboard control surfaces 18, that is the surfaces 18 closest to the fuselage 10, may be employed as ailerons and the outboard surfaces 18 may be used as flaps or the surfaces may be employed in any other manner without departing from the invention. It is apparent that the control surfaces 18 need not extend the full span of the wings 11 and, as indicated in Figure 1, the outboard surfaces 18 may terminate some distance from the wing tips.

The control surfaces 18 are supported for angular movement on spanwise extending tubes 20 secured to or rigid with the trailing edge structure of the wings 11. The forward edges or sides of the control surfaces 18 are concave and shaped to ride or bear on their respective tubes 20 and axially spaced bearing straps 21 on the surfaces 18 encircle or continue on around the tubes 20. The concave forward sides of the control surfaces 18 and the bearing straps 21 rotatably bear on the tubes 20 to support the flaps or surfaces 18 for angular movement about the longitudinal axes of the tubes and, therefore, relative to the trailing edges of the wings 11. Actuators 22 are provided to move or actuate the respective control surfaces 18 to selected or required angular positions. The actuators 22 may be electrical or hydraulic devices secured in the aft portions of the wings 11 and operatively connected with the respective control surfaces 18 by rods 23 having sliding pivotal connections with horns or arms 24 attached to the bearing straps 21. The broken lines and full lines in Figures 3, 7 and 8 illustrate various positions to which the control surfaces 18 may be moved or actuated.

In accordance with the invention the high pressure propulsive gas streams from one or more of the engines 14 are directed to discharge over and adjacent the control surfaces 18 at the trailing edges of the wings 11 to increase wing lift, reduce aerodynamic drag, reduce jet noise and permit jet thrust reversal to reduce the speed of flight as during landing, etc. The invention includes means for diverting the propulsive jet streams from the engine tail pipes 16 into the ducts or tubes 20 of the control surfaces 18. These means include fittings 26 resembling "cross" fittings interposed between the tail pipes 16 and the propulsive nozzles 17. The fittings 26 are tubular to allow through flow of the propulsive jet stream from the pipes 16 to the propulsive nozzles 17 and the fittings have lateral arms or branches 27 connected at their outer ends with the tubes 20 to deliver the propulsive jet streams thereto. The invention further includes diverters or valves in the fittings 26 for closing off the branches 27 to provide for the full discharge of the propulsive stream from the nozzles 17, operable to close off the through flow to the nozzles and open the branches 27 to cause the propulsive jet streams to flow out through the tubes 20 and movable to intermediate positions where the propulsive streams are divided to partially discharge from the nozzles 17 and partially blow through the tubes 20. The particular valves or diverters illustrated include closure leaves 30 hinged or pivoted on the interiors of the fittings 26 at the aft walls of the branches 27. The leaves 30 are movable between positions where they lie flush with the internal walls of the fittings 26 to each close off a branch 27 and thus allow unrestricted straight full flow aft through the propulsive nozzles 17 and positions where they converge forwardly to engage one with the other in the medial regions of the fittings to close off the propulsive nozzles 17 and to leave the branches 27 open. The leaves 30 are shown in full lines in Figure 2A in the last named positions where they close off the forward end of the respective propulsive nozzle 17 and are shown in broken lines where they close off their respective branches 27. It will be observed that when the leaves 30 are in the full line positions of Figure 2 they constitute effective flow diverters for directing the high pressure, high velocity propulsive stream laterally into the two branches 27 serving to divide the stream into two substantially equal branch streams which flow outwardly through the related tubes 20 and to permit cross flow of the propulsive streams from one tube 20 to the other tube 20. The means for moving or actuating the diverter valve leaves 30 of each valve comprises lever arms 31 connected to the leaves at their pivotal mounts and having sliding pivotal engagement with a block 32. Each block 32 is moved fore and aft by an electric or hydraulic actuator 33 having a rod 34 attached to the block to move the same. In practice, the mechanisms for actuating or moving the valve leaves 30 are at the exteriors of the fittings 26 to be clear of the high temperature propulsive gas streams and are connected with the leaves at their pivotal mountings.

The invention further includes means at the tubes 20 for discharging the propulsive gas in the form of elongate spanwise extending layers or propulsive jets. The tubes 20 are designed, constructed, and arranged to have elongate slots or exits extending longitudinally of their long axes for discharging the propulsive streams as relatively thin span-wise extending rearwardly directed layers or sheets. In practice these exits may take the form of what will be termed nozzles or spouts 35. The spouts 35 have communication with the upper internal regions of the tubes 20 and protrude from the tubes so as to direct the discharging or spouting gas stream aft, over or across the upper sides of the respective control surfaces 18. The spouts 35 have their interiors or passages curving upwardly and aft from the walls of the tubes 20 and their exit ends face aft or aft and slightly downward. Thus with a related flap or control surface 18 in a neutral position where it in effect forms a continuation of the airfoil or wing 11, the exit of the related spout 35 is above, adjacent and substantially parallel with the top face of the surface 18. This is shown in Figures 3 and 7. The propulsive gases are discharged from the spout 35 in a relatively thin spanwise extending layer which is substantially parallel with the face of the control surface 18. When the control surface 18 is deflected downwardly the exit of the spout 35 is no longer generally parallel with the top face of the control surface but owing to what is termed the "Coanda effect" the layer-like jet stream follows and remains substantially parallel with the top face of the control surface. This is illustrated in Figure 8 of the drawings. The layer-like propulsive jet stream continues beyond the trailing edge of the control surface 18 to, in effect, extend the effective area thereof. Further, the jet streams discharging from the spouts 35 energize the boundary layer air on the wings to reduce aerodynamic drag effects and increase the loop of air over the wings to materially increase wing lift. These and other actions of the propulsive system will be later described.

It will be observed that the tubes 20 on each side of each engine 14 receive the propulsive jet streams from the engines when the diverter or valve leaves 30 are in the full line positions of Figure 2 so that the several tubes 20 of the wing 11, connected by the open valves, constitute a continuous manifold or duct for substantially uniformly distributing the propulsive jet streams to the several spouts 35. While the invention contemplates continuous uninterrupted slots or spouts 35, it will usually be desirable to provide spaced vertical webs 36 in the spouts for structurally connecting their upper lower walls. The remote ends of the tubes 20 are, of course, closed to prevent the escape or discharge of the propulsive jet streams therefrom.

The invention further includes means for producing jet thrust reversal of the propulsive gas streams discharged from the tubes 20. These means include spouts or passages 37 communicating with the interiors of the tubes 20 and extending downwardly and forwardly therefrom to the under sides of the wings 11. These passages 37 are pitched forwardly at a substantial angle to discharge the propulsive gas streams forwardly and downwardly from the under sides of the wings 11 and thus obtain a braking or decelerating action. A valve 38 is provided in each tube 20 to selectively control its spout 35 and reversing passage 37. The valves 38 are carried by or fixed to central shafts 40 extending axially through the tubes to project from the ends thereof for connection with actuators 41. The shut-off valves 38 are arcuate or segmental and are adapted to move circumferentially along the interior of the tubes 20 between positions where they close the passages 37 and positions where they close the spouts 35. Stop shoulders 42 and 43 are provided on the interior of the tubes 20 to stop and locate the valves 38 in these two respective positions. Figure 3 shows a valve 38 in full line position where it closes a thrust reversing passage 37 and illustrates the valve in broken lines where it closes the related spout 35. The actuators 41 for moving the shut-off valves 38 may be reversible electric motors, or the equivalent, operatively connected with the shafts 40 by chain and sprocket drives, or the like. It will be seen how the actuators 41 may be remotely controlled to cause the valves 38 to be rotated or moved between the positions where they close off the passages 37 and the positions where they close off the spouts 35.

It is preferred to close the outer or lower ends of the reversing passages 37 when the same are not in use so as to reduce aerodynamic drag. I provide flaps 45 hinged at 46, see Figure 3, to be movable between closed positions where they close off the lower ends of the passages 37 and are flush with the lower skin of the wings 11 and open positions where they lie against the upper walls of the passages. Actuators 47 in the wings 11 have operative connections with the flaps 45 and are operable to move the flaps between their open and closed positions. The actuators 41 and 47 are coordinated or related so that the flaps 45 are closed when the shut-off valves 38 are actuated to the positions at the stop shoulders 42 where they shut off the reversing passages 37 and so that the flaps 45 are moved to the open positions when their related shut-off valves 38 are moved to the positions at the shoulders 43 where they close off the spouts 35. It will be seen that with the valve leaves 30 in the positions where they divert the propulsive jet streams into the tubes 20 and with the valves 38 in the positions where they close the spouts 35, the propulsive jet streams discharge forwardly from the passages 38 to exert a reverse thrust to decelerate the airplane.

The thrust reversing passages 37 may or may not be provided adjacent each control surface 18 and may or may not extend the spanwise extent of the related or adjacent control surface. In Figure 5, the thrust reversing passage 37 is shown terminating short of the end of the tube 20 and in most instances it will be preferred to employ reversing passages 37 of less spanwise aggregate extent than the spouts 35. As best seen in Figure 13, the reversing passages 37 are elongate and extend spanwise to discharge downwardly and forwardly directed sheets or layers of the propulsive gases under pressure.

Figure 4 illustrates another form of control surface and propulsive nozzle or spout arrangement of the invention. In this case the spout 50, corresponding generally with the above described spouts 35, is angularly deflected together with the control surface 18$^a$. In such an arrangement the tube 20$^a$ for conducting the propulsive gas stream from the diverter valves 30, may be rotatably mounted on the trailing edge of the wing 11 and the surface 18$^a$ together with its spout 50 may be integral or rigid therewith. The tube 20$^a$ bears in a seat 51 in the trailing edge of the wing 11 and is supported by spaced bearing straps 52 projecting from the edge of the wing to encircle the aft portion of the tube. An actuator 53 in the wing 11 is operatively connected with the tube 20$^a$ and is operable to move the flap 18$^a$ and its spout 50 to various angular positions as required for control and trim during flight. The action of the propulsive jet stream or layer-like jet discharging from the spout 50 is substantially the same as described above in connection with the spouts 35 except in this instance the jet streams are at all times directed at the same angle as their related control surfaces 18$^a$.

Figure 11 shows an embodiment or application of the invention in which the wings 11 carry or house pluralities of propulsive jet producing engines 60 having their air inlets 61 at the leading edges and supplying propulsive jet streams to spanwise extending ducts 62 on the trailing edges of the wings. The ducts 62 may correspond with or may be substantially identical to the tubes 20 described above. Further, the control surfaces 18 and the spouts 35 may be the same as already described so that the jet streams discharged from the spouts pass over the control surfaces. In this construction the propulsive jet streams from the nozzles or spouts 35 may provide the primary propulsion although it will be apparent the aircraft may be provided with additional propulsion means for primary thrust.

In Figure 12 I have shown the invention associated with or incorporated in an aircraft having a propulsive jet producing engine 70 suspended from a wing 71 by a pylon 72. The engine 70 has a tail pipe 73 and a propulsive nozzle 74 thereon for directly discharging the jet stream aft from the engine nacelle or pod 75. The wing 71 is provided with the control surface 18$^b$ and the tube 20$^b$ at its trailing edge, the tube 20$^b$ having the nozzles or spouts 35$^b$ all corresponding with the surfaces 18, tubes 20 and spouts 35 above described. A duct 77 extends through the pylon 72 from the engine to the tube 20$^b$. In practice, a fitting is interposed between the tail pipe 73 and the propulsive nozzle 74 and the lower end of the tube 77 is adapted to receive the propulsive jet stream from this fitting. A flap valve 78 in the fitting 26$^a$ is movable between positions where it closes the duct 77 to provide for the discharge of the entire propulsive jet stream from the nozzle 74, where it closes the nozzle 74 to provide for the discharge of the entire propulsive jet stream from the control surface nozzles or spouts 35$^b$ and where it divides the propulsive gas stream for partial discharge from the primary nozzle 74 and partial discharge from the control surface spouts 35$^b$, An actuator 79 in the pylon 72 or engine pod 75 is remotely controllable to move the valve 78 to the selected or required position. It will be apparent that two or more engines 70 may be used and that the control surfaces 18b, tubes 20b and exits 35b may be arranged and employed in the same manner as the surfaces 18, tubes 20 and exits 35.

It is believed that the features and operation of the invention will be readily understood from the foregoing detailed description. In the embodiment of the invention illustrated in Figures 1, 2, 3 and 4 to 8 and 13, the diverter valve leaves 30 may be operated at will to positions where they provide for the full discharge of the propulsive jet streams from the nozzles 17, where the entire propulsive jet stream is delivered to the tubes 20 for discharge from the spouts 35 and where the propulsive stream is divided for discharge from both both the nozzles 17 and the spouts 35. The high pressure, high velocity propulsive gas streams discharging from the spouts 35 over and parallel with the top surfaces of the flaps or ailerons 18 in addition to providing propulsive thrust afford means for obtaining highly effective control and trim. The layer-like propulsive streams from the spouts 35 materially increase wing lift by altering or increasing the air loop over the wings and by activating the boundary layer. As already described, the valves 38 may be adjusted to positions where they close the spouts 35 and leave the thrust reversal passages 37 open for the forward and downward discharge of the propulsive gas stream from these passages when the thrust reversal action is required. It should be observed that both a jet flap action and a thrust reversal action are obtainable from the control surface and propulsive gas stream discharging arrangements or mechanisms herein described. The constructions are simple, compact, light in weight and readily incorporated in aircraft of various classes and designs.

Having described only typical forms of the invention I do not wish to be limited to the specific details herein set forth, but wish to reserve to myself any variations or modifications that may appear to those skilled in the art and fall within the scope of the following claims.

I claim:

1. In an aircraft the combination of, an airframe including an airfoil having an edge, a control surface extending beyond said edge, means carried by the airframe and producing a reaction propulsive gas stream, and a tube extending between said edge and said control surface, said tube connected to said gas stream producing means to receive said stream, said control surface angularly movable about the axis of said tube to extend beyond said edge, the tube having an exit elongated spanwise of the airfoil for discharging the gas stream from the tube in the form of a layer of gas discharging over the control surface.

2. In an aircraft the combination of, an airframe including an airfoil having a trailing edge, a control surface extending beyond said edge, an engine carried by the airframe and producing a reaction propulsive gas stream, a tube extending between said trailing edge and said control surface, said tube connected to said gas stream producing engine to receive said stream, said control surface angularly movable about the axis of said tube, and a protruding spout on the tube elongated spanwise of the airfoil and directed aft to discharge a sheet-like layer of the propulsive gas over the control surface.

3. In an aircraft the combination of, an airframe including an airfoil having a trailing edge, means carried by the airframe and producing a propulsive gas stream, a control surface at said trailing edge, means supporting the control surface for angular movement about a spanwise axis, a tube extending along said edge and connected to the first named means to receive said propulsive stream, first exit means in said tube for discharging the propulsive gas stream from the tube aft over the control surface, second exit means in said tube for discharging the propulsive gas from the tube forwardly from the underside of the wing, and valve means for controlling the two exit means.

4. In an aircraft the combination of, an airframe including an airfoil having a trailing edge, engine means carried by the airframe and producing a propulsive gas stream, a control surface at said trailing edge, means supporting the control surface for angular movement about a spanwise axis, a tube extending along said edge and connected to the engine means to receive said propulsive stream, first nozzle means in said tube for discharging the propulsive gas stream from the tube aft over the control surface, second nozzle means in said tube for discharging the propulsive gas from the tube forwardly from the underside of the wing, and a valve in the tube for selectively controlling the two nozzle means.

5. In an aircraft the combination of, an airframe including an airfoil having a trailing edge, engine means carried by the airframe and producing a propulsive gas stream, a control surface at said trailing edge, means supporting the control surface for angular movement about a spanwise axis, a tube extending along said edge and connected to said engine means to receive said propulsive stream, first nozzle means in the tube for discharging the propulsive gas stream from the tube aft over the control surface, second nozzle means in the tube for discharging the propulsive gas from the tube forwardly from the underside of the wing, and a valve rotatable in the tube to close either nozzle means while leaving the other open.

6. In an aircraft the combination of, an airframe including an airfoil having a trailing edge, engine means carried by the airframe and producing a propulsive gas stream, a control surface at said trailing edge, means supporting the control surface for angular movement about a spanwise axis, a tube extending along said edge and connected to said engine means to receive said propulsive stream, first exit means in the tube for discharging the propulsive gas stream from the tube aft over the control surface, second exit means in the tube for discharging the propulsive gas from the tube forwardly from the underside of the wing, both of said exit means being elongated spanwise of the airfoil, and valve means associated with the tube for controlling the two exit means.

7. In an aircraft the combination of, an airframe including an airfoil having a trailing edge, engine means having a tail pipe carried by the airframe and producing a propulsive gas stream, a control surface at said edge, means supporting the control surface for angular movement about a spanwise axis, propulsive nozzle means connected to said tail pipe for discharging said propulsive gas stream aft, a tube extending along said trailing edge, means interposed between the engine means and said propulsive nozzle operable to divert said propulsive stream into the tube, and a spout associated with the tube directed aft over the control surface for discharging the diverted propulsive stream over the control surface.

8. In an aircraft the combination of, an airframe including an airfoil having a trailing edge, an engine carried by the airframe and producing a propulsive gas stream, a control surface at said edge, means supporting the control surface for angular movement about a spanwise axis, a propulsive nozzle incorporated with said engine for discharging said stream aft in the form of a propulsive jet, a tube extending along said trailing edge and connected to said engine-nozzle incorporation to receive said propulsive stream, spout means discharging aft from the tube over the control surface, and diverter valve means interposed between the engine and propulsive nozzle operable to direct said stream to the tube only, to the propulsive nozzle only, and to both the tube and nozzle.

9. In an aircraft, an airfoil having a trailing edge, angularly movable control surfaces extending from said edge, a conducting tube extending spanwise between said edge and said control surface, spouts discharging aft from the tube across the upper sides of the control surfaces, engine means spaced spanwise of the airfoil for producing combustion propulsive gas streams, nozzles aft of the engine means for discharging said streams in the form of propulsive jets, said conducting tube connected to said gas stream producing engine, and valve means interposed between the engine means and nozzles for diverting said streams into the tube for discharge from said spouts.

10. In an aircraft, an airfoil having a trailing edge, angularly movable control surfaces extending from said edge, a conducting tube extending spanwise between said edge and said control surface, spouts protruding upwardly and aft from the tube to discharge rearwardly immediately adjacent the upper sides of the control surfaces, engines spaced spanwise of the airfoil for producing combustion propulsive gas streams and means for conducting said propulsive streams into the tube for discharge from the spouts.

11. In an aircraft, an airfoil having a trailing edge, angularly movable control surfaces extending from said edge, a conducting tube extending along said edge, spouts discharging aft from the tube across the upper sides of the control surfaces, thrust reversing passages leading from the tube to the under side of the airfoil, valve means for selectively closing the spouts and passages, and engine means connected to said tube for supplying propulsive gas streams to the tube for discharge from either the spouts or passages.

12. In an aircraft, an airfoil having a trailing edge, angularly movable control surfaces extending from said edge, conducting tubes extending along said edge, spouts discharging aft from the tubes across the upper sides of the control surfaces, thrust reversal passages in the airfoil leading from the tubes and opening forwardly at the underside of the airfoil, valve means for selectively closing either the spouts or passages, engine means spaced spanwise of the airfoil for producing propulsive gas streams, propulsive nozzles aft of the engine means for discharging said streams in the form of propulsive jets, and means between the engine means and their nozzles for directing said streams into the tube for discharge from either the spouts or passages depending upon the position of the valve means and for interconnecting said tubes.

13. In an aircraft, an airfoil having a trailing edge, angularly movable control surfaces extending from said edge, a conducting tube extending along said edge, spouts discharging aft from the tube across the upper sides of the control surfaces, thrust reversal passages in the airfoil leading from the tube and opening forwardly at the underside of the airfoil, valve means for selectively closing either the spouts or passages, engine spaced spanwise of the airfoil for producing propulsive gas streams, fairing flaps for closing the outer ends of the passages, propulsive nozzles aft of the engines for discharging said streams in the form of propulsive jets, and means between the engines and their nozzles for directing said streams into the tube for discharge from either the spouts or passages depending upon the position of the valve means.

14. In an aircraft the combination of, an airframe including an airfoil having a trailing edge, an engine carried by the airframe and producing a reaction propulsive gas stream, a tube extending along said edge and connected to said engine to receive said stream, a control surface angularly movable about the axis of said tube to extend beyond said edge, and a spout movable with the control surface and communicating with the tube to discharge the gas stream aft across the top of the control surface in generally parallel relation thereto, and means for moving the surface.

15. In an aircraft the combination of an airfoil having an edge, movable control surfaces on said edge, tubes extending along said edge, engine means spaced spanwise of the airfoil and producing combustion propulsive jet streams, a propulsive nozzle means for discharging the stream from each engine means, valve means between the engine means and nozzle means operable to divert said propulsive streams into said tubes and to interconnect the tubes, and exit means movable with the control surface for the tubes discharging the streams over the control surfaces.

16. An aircraft including an airframe having a trailing edge, a fluid conductor extending along said edge, means supporting the conductor on the airframe for angular movement about an axis extending spanwise of said edge, a control surface carried by the conductor to move therewith and to extend aft from said edge, engine means in the airframe and connected to said conductor for supplying a propulsive gas stream thereto, nozzle means movable with the conductor and discharging said stream therefrom rearwardly over the control surface in a sheet-like jet generally parallel with the control surface, and means for moving the conductor, control surface and nozzle means about said axis.

References Cited in the file of this patent

UNITED STATES PATENTS

| | | |
|---|---|---|
| 2,270,920 | Backhaus | Jan. 27, 1942 |
| 2,271,321 | Wagner et al. | Jan. 27, 1942 |
| 2,406,916 | Stalker | Sept. 3, 1946 |
| 2,568,813 | Lundberg | Sept. 23, 1951 |
| 2,585,676 | Poisson-Quinton | Feb. 12, 1952 |

FOREIGN PATENTS

| | | |
|---|---|---|
| 1,103,426 | France | May 25, 1955 |
| 1,107,311 | France | Aug. 3, 1955 |